Patented Sept. 5, 1939

2,171,914

UNITED STATES PATENT OFFICE 2,171,914

HEAT-REACTIVE OIL-SOLUBLE RESIN

William H. Butler, Palisades Park, N. J., assignor to Bakelite Corporation, New York, N. Y., a corporation of Delaware No Drawing. Application December 11, 1934, Serial No. 757,069

14 Claims. (Cl. 260—19)

This invention relates to heat-reactive oil-soluble resinous substances produced by the reaction of trialkyl phenols with methylene-containing agents and to compositions, including varnishes, paints, molded, laminated and impregnated articles and the like, containing such substances.

It has been found that by reacting trialkyl phenols, for example, tar acids boiling between about 225° and 250° C., with methylene-containing agents, such as formaldehyde, preferably in the proportion of at least one mole of methylene-containing agent to one mole of phenolic substance, and advantageously in the presence of an alkaline condensing agent, such as hexamethylene tetramine, a heat-reactive resinous product may be produced which is soluble in fatty oils. When the resinous product is dissolved in drying oils, such as tung oil or linseed oil, a composition is produced which on exposure in thin films produces tough, flexible and durable coatings. The resinous substance may be reacted to advanced stage (B or C) after incorporation in the oil or after the oil-resin composition has been applied as a film or admixed with fillers.

The resinous product is advantageously incorporated with fatty oils by heating the resin and oil together at a temperature of about 120° to 130° C. Polymerization of the resin in the presence of the oil takes place on further heating, for example, at 160° C., and remains in solution in the oil. The rapidity of the polymerization depends on the relative proportion of oil and resin.

As an illustrative example of the production of the new resinous products of the invention, 100 parts of tar acids boiling from about 225° to 250° C., and consisting essentially of trimethyl phenols, are reacted with 100 parts of 37% formaldehyde solution in the presence of 1 part of hexamethylene tetramine, by refluxing for three hours at atmospheric pressure. Volatile components of the reaction mixture are then removed by heating to about 110° C. under vacuum.

The reaction may be carried out with formaldehyde, its derivatives and polymers, such as hexamethylene tetramine and paraformaldehyde, and with other aldehydes, substituted aldehydes and aldehydic substances, such as acetaldehyde, benzaldehyde, furfural, ketones and the like, the conditions of the reaction being adjusted to suit the particular aldehydic substance used.

Instead of hexamethylene tetramine other alkaline condensing agents, such as ammonia and alkali and alkaline earth metal hydroxides, may be used.

While the phenolic substance used in the example is described as tar acids having a boiling point between 225° C. and 250° C., containing essentially trimethyl phenols, the trimethyl phenols may be obtained from other sources and homologous trialkyl phenols, such as ethyl dimethyl phenol, methyl di-iso-propyl phenol, methyl dipropyl phenol, and methyl iso-propyl tertiary-amyl phenol, may be used.

Tung oil is typical of the fatty oils in which the condensation products of the invention are soluble or miscible, but other fatty oils, both drying and non-drying, are also miscible with or solvents for these condensation products. Such oils include linseed, rape seed, castor, perilla, cottonseed, soya bean, corn, fish and other oils. The inclusion of free fatty acids in the oils promotes the oil-soluble property and free fatty acids, such as oleic, linolic, linoleic and the like are miscible with and solvents for these condensation products.

Molded, laminated and impregnated articles, as well as coating compositions, may be made from suitable mixtures containing the phenolic condensation products herein described with oils, fatty acids, etc., and particularly with these mixtures in which the amount of oil is kept within the proportion to yield articles of a rigid nature; for example, an oil content of about 15% based on the amount of condensation product present is a typical mixture suitable for rigid articles. Heating of the mixtures, which may include wood flour, asbestos and other fibers, in the usual or subdivided forms, abrasives or other granular material, while under pressure, effects a transformation of the mixture in the mold or the press, thereby producing a rigid condition. Such heating with the simultaneous application of pressure follows the customary heat molding procedure. The shaping operation can also precede the heating, as in cold molding, and particularly when a filler such as abrasive grains is incorporated for the manufacture of grinding wheels or other abrasive implements. Oil mixtures or the phenolic condensation product by itself may be used as a binder in the manufacture of brake linings and similar fabric or fibrous articles.

I claim:

1. A reaction product of a trialkyl phenol and a methylene-containing substance, said reaction product being, independently of the presence of components other than the phenol and methylene-containing substance, a heat-reactive resinous material substantially free from components volatile under vacuum at 110° C. and soluble in drying oils to produce a composition hardening with heat more rapidly than the drying oil alone.

2. A reaction product of a trialkyl phenol and formaldehyde, said reaction product being, independently of the presence of components other than the phenol and formaldehyde, a heat-reactive resinous material substantially free from components volatile under vacuum at 110° C. and soluble in drying oils to produce a composition hardening with heat more rapidly than the drying oil alone.

3. A reaction product of a trimethyl phenol and a methylene-containing substance, said reaction product being, independently of the presence of components other than the phenol and methylene-containing substance, a heat-reactive resinous material substantially free from components volatile under vacuum at 110° C. and soluble in drying oils to produce a composition hardening with heat more rapidly than the drying oil alone.

4. A reaction product of a trimethyl phenol and formaldehyde, said reaction product being, independently of the presence of components other than the phenol and formaldehyde, a heat-reactive resinous material substantially free from components volatile under vacuum at 110° C. and soluble in drying oils to produce a composition hardening with heat more rapidly than the drying oil alone.

5. A reaction product of a methylene-containing substance and tar acids boiling between about 225° and 250° C., substantially free from phenols boiling outside the said temperature range, said reaction product being, independently of the presence of components other than the tar acids and the methylene-containing substance, a heat-reactive resinous material substantially free from components volatile under vacuum at 110° C. and soluble in drying oils to produce a composition hardening with heat more rapidly than the drying oil alone.

6. A method of making a heat-reactive oil-soluble phenolic resin which comprises reacting a trialkyl phenol with at least one mole of a methylene-containing substance to each mole of the phenol in the presence of a catalyst of approximately the alkalinity of ammonia and removing substantially all of the components of the reaction product which are volatile under vacuum at 110° C., thereby producing a resinous material which, independently of the presence of components other than the phenol and the methylene-containing substance, is heat-reactive and soluble in drying oils to produce a composition hardening with heat more rapidly than the drying oil alone.

7. A method of making a heat-reactive oil-soluble phenolic resin which comprises reacting a trimethyl phenol with at least one mole of a methylene-containing substance to each mole of the phenol in the presence of a catalyst of approximately the alkalinity of ammonia and removing substantially all of the components of the reaction product which are volatile under vacuum at 110° C., thereby producing a resinous material which, independently of the presence of components other than the phenol and the methylene-containing substance, is heat-reactive and soluble in drying oils to produce a composition hardening with heat more rapidly than the drying oil alone.

8. A method of making a heat-reactive oil-soluble phenolic resin which comprises reacting a trimethyl phenol with at least one mole of formaldehyde to each mole of the phenol in the presence of a catalyst of approximately the alkalinity of ammonia and removing substantially all of the components of the reaction product which are volatile under vacuum at 110° C., thereby producing a resinous material which, independently of the presence of components other than the phenol and formaldehyde, is heat-reactive and soluble in drying oils to produce a composition hardening with heat more rapidly than the drying oil alone.

9. A method of making a heat-reactive oil-soluble phenolic resin which comprises reacting tar acids boiling between about 225° and 250° C., substantially free from phenols boiling outside said temperature range, with at least one mole of a methylene-containing substance to each mole of tar acid in the presence of a catalyst of approximately the alkalinity of ammonia and removing substantially all of the components of the reaction product which are volatile under vacuum at 110° C., thereby producing a resinous material which, independently of the presence of components other than the tar acids and the methylene-containing substance, is heat-reactive and soluble in drying oils to produce a composition hardening with heat more rapidly than the drying oil alone.

10. A method of making heat-reactive oil-soluble phenolic resin which comprises reacting tar acids boiling between about 225° and 250° C., substantially free from phenols boiling outside said temperature range, with at least one mole of formaldehyde to each mole of tar acid in the presence of a catalyst of approximately the alkalinity of ammonia and removing substantially all of the components of the reaction product which are volatile under vacuum at 110° C., thereby producing a resinous material which, independently of the presence of components other than the tar acids and formaldehyde, is heat-reactive and soluble in drying oils to produce a composition hardening with heat more rapidly than the drying oil alone.

11. A method of making a heat-reactive oil-soluble resin which comprises reacting 100 parts of tar acids boiling between about 225° to 250° C. and substantially free from phenols boiling outside said temperature range with about 37 parts of formaldehyde in the presence of about 1 part of hexamethylene-tetramine and removing substantially all of the components of the reaction product which are volatile under vacuum at 110° C., thereby producing a resinous material which, independently of the presence of components other than the tar acids and formaldehyde, is heat-reactive and soluble in drying oils to produce a composition hardening with heat more rapidly than the drying oil alone.

12. A composition of matter comprising a drying oil and dissolved therein a reaction product of a methylene-containing substance and a trialkyl phenol substantially free from components volatile under vacuum at 110° C. and capable of being advanced by heating to the B or C stage, said composition being hardenable under the action of heat at a substantially higher rate than the drying oil alone.

13. A composition of matter comprising a drying oil and dissolved therein a reaction product of formaldehyde and a trialkyl phenol substantially free from components volatile under vacuum at 110° C. and capable of being advanced by heating to the B or C stage, said composition being hardenable under the action of heat at a substantially higher rate than the drying oil alone.

14. A composition of matter comprising a drying oil and dissolved therein a reaction product of formaldehyde and a trimethyl phenol substantially free from components volatile under vacuum at 110° C. and capable of being advanced by heating to the B or C stage, said composition being hardenable under the action of heat at a substantially higher rate than the drying oil alone.

WILLIAM H. BUTLER.